US000001902H

United States Statutory Invention Registration [19]

[11] Reg. Number: H1,902

Hoxmeier et al.

[45] Published: Oct. 3, 2000

[54] ASYMMETRIC RADIAL POLYMERS WITH ACRYLIC MONOMER ARMS

[75] Inventors: Ronald James Hoxmeier; Bridget Ann Spence, both of Houston, Tex.

[73] Assignee: Shell Oil Company, Houston, Tex.

[21] Appl. No.: 08/680,310

[22] Filed: Jul. 11, 1996

Related U.S. Application Data

[60] Provisional application No. 60/001,897, Aug. 4, 1995.

[51] Int. Cl.[7] ..... C08F 295/00

[52] U.S. Cl. ..... 525/299; 525/314

[58] Field of Search ..... 525/314, 299

[56] References Cited

U.S. PATENT DOCUMENTS

| | | | |
|---|---|---|---|
| H1597 | 9/1996 | Erickson et al. | 522/158 |
| 5,247,026 | 9/1993 | Erickson et al. | 525/331.9 |
| 5,393,841 | 2/1995 | Himes et al. | 525/314 |
| 5,446,093 | 8/1995 | Hoxmeier et al. | 525/89 |
| 5,447,995 | 9/1995 | Hoxmeier et al. | 525/314 |
| 5,458,792 | 10/1995 | Rhodes et al. | 252/43 |
| 5,486,574 | 1/1996 | Himes et al. | 525/314 |

*Primary Examiner*—Peter A. Nelson
*Attorney, Agent, or Firm*—Donald F. Haas

[57] ABSTRACT

The invention described herein is an asymmetric radial block copolymer having at least one set of arms formed of at least one polymer block of at least one vinyl aromatic hydrocarbon and/or at least one polymer block formed of at least one conjugated diene and at least one set of arms formed of at least one polymer block of at least one acrylic monomer.

7 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ASYMMETRIC RADIAL POLYMERS WITH ACRYLIC MONOMER ARMS

CROSSREFERENCE TO RELATED APPLICATION

This application claims the benefit of U.S. provisional application No. 60/001,897, filed Aug. 4, 1995.

BACKGROUND OF THE INVENTION

The present invention relates to novel asymmetric radial polymers. More particularly, this invention relates to asymmetric radial polymers of conjugated dienes and/or vinyl aromatic hydrocarbons and acrylic monomers.

As is well known in the prior art, radial polymers comprise three or more arms extending outwardly from a nucleus. Asymmetric radial polymers contain arms of at least two different polymers, which polymers may vary as to chemical composition, structure and/or molecular weights. Asymmetric radial polymers having arms of different molecular weights are sometimes referred to as polymodal polymers. The asymmetric radial block copolymers which are known generally are comprised of arms that are formed of blocks of vinyl aromatic hydrocarbons and/or conjugated dienes.

The present invention provides a different kind of radial asymmetric block copolymer. The invention described herein is a radial block copolymer which contains arms which are formed from the monomers described above and arms formed from acrylic monomers. These polymers are desirable because they incorporate polar functionality which may enhance the usefulness of the polymers in compatibility with polar polymers, adhesion to polar surfaces, and solubility or dispersibility in aqueous/polar media. These polymers may then be useful in adhesives, impact modification of engineering thermoplastics, and as compatibilizers for blends of polar and non-polar polymers.

SUMMARY OF THE INVENTION

The polymers described herein will have at least one set of polymer arms which is formed by polymerizing one or more conjugated dienes or vinyl aromatic hydrocarbons or both to form a block copolymer arm containing both. The polymers contain at least one other set of arms which are formed by polymerizing an acrylic monomer, preferably tert-butyl methacrylate.

DESCRIPTION OF THE INVENTION

In general, the polymers produced herein may be polymers of one or more conjugated dienes containing from 4 to 12 carbon atoms such as 1,3-butadiene, isoprene, piperylene, methyl pentadiene, phenyl butadiene, 3,4-dimethyl-1,3-hexadiene, 4,5-diethyl-1,3-octadiene and the like, preferably those conjugated diolefins containing from 4 to 8 carbon atoms. The polymers may also be copolymers of one or more of the above conjugated diolefins and one or more vinyl aromatic hydrocarbon monomers such as styrene, various alkyl substituted styrenes, alkoxy substituted styrenes, vinyl naphthalene and the like. Homopolymers and copolymers of monoalkenyl aromatic hydrocarbons may also be useful as polymer arms in the present invention.

Acrylic monomer polymer arms must also be incorporated. The acrylic monomers used in the composition of the present invention may have the structure

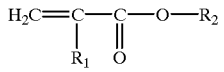

where $R_1$ is hydrogen, phenyl or an alkyl radical which is linear or branched and has from 1 to 10 carbon atoms and $R_2$ is an alkyl radical which has from 1 to 14 carbon atoms, may contain a tertiary amine or an ether linkage and may be a cyclic hydrocarbon.

Alkyl methacrylates are preferred for use herein and those employed herein include methacrylates wherein the alkyl group has up to 14 carbon atoms inclusive. Derivatives of these polymers are also included herein, such as, for example, polymers with partially or completely acidified methacrylate groups, their anhydrides, their ionomers, their reaction products with alcohols and amines, and the like. Derivatives of alkyl methacrylates include methacrylic acid, methacrylic acid salts (for example, zinc, sodium and quaternary ammonium salts) and anhydrides formed between adjacent acid units by heating. It should be noted that derivatization of the methacrylate group must be carried out after reaction of the methacrylate polymer with the coupling agent so as not to interfere with the coupling reaction. Illustrative of such methacrylate esters are methyl methacrylate, ethyl methacrylate, sec-butyl methacrylate, t-butyl methacrylate, i-amyl methacrylate, hexyl methacrylate, decyl methacrylate and dodecyl methacrylate. Largely because of ease of polymerization, the preferred alkyl methacrylates are branched-butyl methacrylates, i.e., isobutyl methacrylate and t-butyl methacrylate. The desired poly(alkyl methacrylate) block is produced by directly polymerizing the corresponding alkyl methacrylate monomer or alternatively the desired block is obtained by polymerizing a more easily polymerizable methacrylate and subsequently transesterifying the product to introduce the desired alkyl group. Tertiary butyl methacrylate (TBMA) is preferred because of ease of purification and polymerization.

Living polymers containing a single terminal group are, of course, well known in the prior art. Methods for preparing such polymers are taught, for example, in U.S. Pat. Nos. 3,150,209; 3,496,154; 3,498,960; 4,145,298 and 4,238,202. Methods for preparing block copolymers such as those preferred for use in the method of the present invention are also taught, for example, in U.S. Pat. Nos. 3,231,635; 3,265,765 and 3,322,856. These patents are herein incorporated by reference. When the polymer product is a random or tapered copolymer, the monomers are, generally, added at the same time, although the faster reacting monomer may be added slowly in some cases, while, when the product is a block copolymer, the monomer used to form the separate blocks are added sequentially.

In general, the polymers useful as arms in the asymmetric radial polymers of this invention may be prepared by contacting the monomer or monomers with an organoalkali metal compound in a suitable solvent at a temperature within the range from −150° C. to 300° C., preferably at a temperature within the range from 0° C. to 100° C. Particularly effective polymerization initiators are organolithium compounds having the general formula:

wherein R is an aliphatic, cycloaliphatic, alkyl-substituted cycloaliphatic, aromatic or alkyl-substituted aromatic hydrocarbon radical having from 1 to 20 carbon atoms.

In general, the polymers useful as arms in the asymmetric radial polymers of this invention will be in solution when contacted with the coupling agent. Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane, heptane and the like, cycloaliphatic hydrocarbons such as cyclohexane, cycloheptane and the like, alkyl-substituted cycloaliphatic hydrocarbons such as methylcyclohexane, methylcycloheptane and the like, aromatic hydrocarbons such as benzene and the alkyl-substituted aromatic hydrocarbons such as toluene, xylene and the like and ethers such as tetrahydrofuran, diethylether, di-n-butyl ether and the like. Since the polymers useful in making the asymmetric radial polymers of this invention will contain a single terminal reactive group, the polymers used in preparation of the asymmetric radial polymers will be retained in solution after preparation without deactivating the reactive (living) site. In general, the coupling agents may be added to a solution of the polymer or a solution of the polymer may be added to the coupling agent.

Silicon-based coupling agents may be particularly useful in making the polymers of the present invention. Such agents may be $X_3Si\text{-}(CH_2)_n\text{,-}SiX_3$, $RSiX_3$, $SiX_4$, $C\text{-}[(CH_2)_n\text{-}SiX_3)]_4$, etc. where n is greater than or equal to 0, R is alkyl or aryl, and X is halogen, alkoxy, hydride. Specific examples include bis(trimethoxysilyl)ethane, bis (trichlorosilyl)ethane, and 1,6-bis(trichlorosilyl)hexane. These may be used to make 6 armed polymers. Polymers with 3 to 12 arms are also contemplated herein.

In general, any polar compound known to be suitable for increasing the vinyl content in diolefin polymers will be suitable for use as a coupling activator to increase the activity of the later reacting sites of the coupling agent used in the process to make the polymers of this invention. Suitable polar compounds include the Lewis bases. Suitable polar compounds, then, include ethers, such as diethyl ether, dibutyl ether, tetrahydrofuran, ethylene glycol dimethyl ether, ethylene glycol dibutyl ether, ethylene glycol diethyl ether, diethylene glycol dibutyl ether, dioxane, triethylene glycol ether, 1,2-dimethoxy benzene, 1,2,3-trimethoxy benzene, 1,2,4-trimethoxy benzene, 1,2,3-triethoxy benzene, 1,2,3-tributoxy benzene, 1,2,4-triethoxy benzene and the like. Suitable polar compounds also include tertiary amines such as triethyl amine, tributyl amine, N,N,N',N'-tetramethyl ethylene diamine and the like. Suitable polar compounds include various pyridine and pyrolidene compounds such as dipipyridinoethane, dipyrolidinoethane and the like.

In general, the coupling activator will be used at a concentration within the range from 10 to 1000 ppm. The preferred coupling activators are ethylene glycol diethyl ether, orthodimethoxybenzene, N,N,N',N'-tetramethylethylenediamine, diethylether, and the like, with ethylene glycol diethyl ether being most preferred.

The asymmetric radial block copolymers of the present invention may have molecular weights varying over a wide range. In general, the molecular weights of these block copolymer arms will range from about 1000 up to as much as 250,000. The preferred conjugated diene/vinyl aromatic hydrocarbon block copolymer arms of the present invention fall within the molecular weight range of 1000 to 50,000. The acrylic monomer arms range in molecular weight from 500 to 100,000, preferably 1000 to 50,000.

The molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the main species shown on the chromatograph. For polydisperse polymers the weight average molecular weight should be calculated from the chromatograph and used. For materials to be used in the columns of the GPC, styrene-divinyl benzene gels or silica gels are commonly used and are excellent materials. Tetrahydrofuran is an excellent solvent for polymers of the type described herein. A refractive index detector may be used.

Measurement of the true molecular weight of the final coupled radial or star polymer is not as straightforward or as easy to make using GPC. This is because the radial or star shaped molecules do not separate and elute through the packed GPC columns in the same manner as do the linear polymers used for the calibration, and, hence, the time of arrival at a UV or refractive index detector is not a good indicator of the molecular weight. A good method to use for a radial or star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wavelength and in the same solvent used for the light scattering. The following references are herein incorporated by reference:

1. *Modern Size-Exclusion Liquid Chromatography*, W. W. Yau, J. J. Kirkland, D. D. Bly, John Wiley & Sons, New York, N.Y., 1979.
2. *Light Scattering from Polymer Solution*, M. B. Huglin, ed., Academic Press, New York, N.Y., 1972.
3. W. Kaye and A. J. Havlik, *Applied Optics,* 12, 541 (1973).
4. M. L. McConnell, *American Laboratory,* 63, May, 1978.

These polymers may be hydrogenated after they are coupled. They may also be partially hydrogenated such that one portion of the polymer is hydrogenated and another is not. For example, styrene-butadiene arms could be made as well as isoprene arms. It is possible to selectively hydrogenate the butadiene in the styrene-butadiene arms and not significantly hydrogenate the isoprene arms. The hydrogenation can take place in a selective manner with a suitable catalyst and conditions like those described in Reissue 27,145, U.S. Pat. No. 4,001,199 or with a titanium catalyst such as disclosed in U.S. Pat. No. 5,039,755, all of which are incorporated herein by reference.

The asymmetric radial polymers of this invention may be used in any of the applications for which asymmetric radial polymers having the same relative arm structure can be used. Suitable end use applications, then, include impact modification of engineering thermoplastics, compatibilization of polymer blends, tie layers, impact modification of unsaturated thermosetting polyesters, adhesives, asphalt modification, and the like. They would be most advantageous in uses which require that the polymer have some degree of polarity.

EXAMPLE 1

16 g of isoprene in 64 g of cyclohexane was polymerized with s-BuLi to give $I^-Li^+$ with MW=18,000. This was coupled with $SiCL_4$ without activator (Li:Si=2:1) to give a partially coupled intermediate containing, on average, two polyisoprene arms whose composition was determined by GPC to be 41 weight percent $I_2SiCl_2$, 46 percent $ISiCl_3$ and 13 percent $I_3SiCl$. To this was added 10.7 g of TBMA (tertiarybutylmethacrylate) monomer and 10.6 ml of an initiator solution obtained by reacting 16 mmoles of 1,1-diphenylethylene with 6 mmoles of s-butyllithium at 60° C. for 3 hours in 60 ml of cyclohexane. This initiator solution contains 0.1 mmoles of initiator per ml of solution.

The TBMA was polymerized for 5 minutes at ambient temperature in the presence of the partially coupled intermediate to give $TBMA^-Li^+$. Then 1000 ppm diethyleneglycol diethylether was added to activate and catalyze the second coupling step (coupling of $TBMA^-Li^+$ to $I_2SiCl_2$) and the coupling reaction was allowed to proceed 30 minutes at 70° C. The final solution was coagulated into acetone to remove TBMA homopolymer and the asymmetric radial polymer was collected by filtration and dried. Proton NMR analysis showed the product to contain about 14 percent by weight grafted poly-TBMA.

EXAMPLE 2

Initiator synthesis for PS-PTBMA block copolymer arms for the second coupling step was carried out as follows. Three grams of styrene in 100 g of cyclohexane was polymerized with 3 mmoles of s-buLi at 50° C. for 30 minutes. GPC showed the $PS^-Li^+$ initiator=1000 MW.

One-pot synthesis of $(PI)_2(PS\text{-}PTBMA)_2$ asymmetric radial polymer is described next. In reactor A, 20 g of isoprene in 80 g of cyclohexane was polymerized with 2.5 mmoles of s-BuLi at 60° C. for 1 hour. This was coupled (without activator) with 1.25 mmoles $SiCl_4$ (Li:Si=2:1) to give $I_2SiCl_2$. GPC analysis showed the composition to be about 65 percent by weight $I_2SiCl_2$ with the remaining 33 percent comprising approximately equal quantities of $ISiCl_3$ and $I_3SiCl$. To this solution was added 15 g of TBMA monomer and all of the $PS^-Li^+$ initiator solution described above. The TBMA was allowed to polymerize for 5 minutes at ambient temperature. A GPC sample of this solution showed the PS-PTBMA block to have polystyrene equivalent MW=1900 versus 1000 MW for PS block alone.

1000 ppm of diethyleneglycol diethylether was then added to activate and catalyze the second coupling step and the solution was coupled at 60° C. for 30 minutes. The final solution was coagulated into acetone to remove ungrafted PS-PTBMA and the $(PI)_2$ -$(PS\text{-}PTBMA)_2$ asymmetric radial polymer was collected by filtration and dried. GPC analysis showed that there was no ungrafted PS-PTBMA arms in the purified product and also showed (UV detector) that all three components of $I_2SiCl_2$ (namely, $I_2SiCl_2$, $ISiCl_3$, and $I_3SiCl$) had a substantial amount of PS-PTBMA block copolymer arms grafted to the first coupling step products.

We claim:

1. An asymmetric radial block copolymer having at least one set of arms formed of at least one polymer block of at least one vinyl aromatic hydrocarbon and/or at least one polymer block formed of at least one conjugated diene and at least one set of arms formed of at least one polymer block of at least one acrylic monomer.

2. The copolymer of claim 1 wherein one set of polymer arms is comprised of a block copolymer of styrene and isoprene and/or butadiene and another set of polymer arms is comprised of an acrylic monomer.

3. The copolymer of claim 2 wherein the acrylic monomer is an alkyl methacrylate.

4. The copolymer of claim 3 wherein the acrylic monomer is tertiary butyl methacrylate.

5. The copolymer of claim 1 wherein one set of polymer arms is comprised of a block copolymer of a monomer selected from the group consisting of styrene, isoprene, and butadiene and another set of polymer arms is comprised of an acrylic monomer.

6. The copolymer of claim 5 wherein the acrylic monomer is an alkyl methacrylate.

7. The copolymer of claim 6 wherein the acrylic monomer is tertiary butyl methacrylate.

* * * * *